(12) United States Patent
Bottner Gómez et al.

(10) Patent No.: US 11,830,338 B2
(45) Date of Patent: Nov. 28, 2023

(54) EARTHQUAKE WARNING SYSTEMS AND RELATED METHODS

(71) Applicant: Xancura SPA, Santiago (CL)

(72) Inventors: Carlos Patricio Bottner Gómez, Santiago (CL); Javier Enrique Celedón Carrasco, Santiago (CL); Mauricio Antonio Godoy Miranda, Santiago (CL); José Ignacio Río Droguett, Santiago (CL)

(73) Assignee: XANCURA SPA, Santiago (CL)

( * ) Notice: Subject to any disclaimer, the term of this patent is extended or adjusted under 35 U.S.C. 154(b) by 18 days.

(21) Appl. No.: 17/262,643

(22) PCT Filed: Jul. 23, 2019

(86) PCT No.: PCT/CL2019/050061
§ 371 (c)(1),
(2) Date: Apr. 8, 2021

(87) PCT Pub. No.: WO2020/019094
PCT Pub. Date: Jan. 30, 2020

(65) Prior Publication Data
US 2021/0358286 A1      Nov. 18, 2021

(30) Foreign Application Priority Data

Jul. 24, 2018   (CL) .................................. 2014-2018

(51) Int. Cl.
*G08B 21/10*       (2006.01)
*G01V 1/00*        (2006.01)

(52) U.S. Cl.
CPC ............. *G08B 21/10* (2013.01); *G01V 1/008* (2013.01)

(58) Field of Classification Search
CPC ........ G08B 21/10; G08B 31/00; G08B 21/00; G01V 1/008; G01V 2210/34; G01V 2210/57; G01V 1/22; G01V 1/00
See application file for complete search history.

(56) References Cited

U.S. PATENT DOCUMENTS 4,042,906 A  *  8/1977  Ezell ...................... G01V 1/223
                                                        367/67
4,152,691 A     5/1979  Ward et al.
(Continued)

FOREIGN PATENT DOCUMENTS

CN    105843146 A    8/2016
CN    106530655 A    3/2017
(Continued)

*Primary Examiner* — An T Nguyen
(74) *Attorney, Agent, or Firm* — IPTechLaw

(57) ABSTRACT

Implementations of a method and system of warning of estimated time of arrival and expected intensity in a given area resulting from a seismic movement including a plurality of measurement elements where the method includes arranging the plurality of measurement elements in a specific area; communicating each of the measuring elements with at least one control center; storing in each measuring element a unique identifier; transforming the measurement of the movement to a scalar representing the intensity of the movement; transmitting periodically and in real time the measurement and the unique identifier to the control center for the duration of the movement; recording the individualized measurements from each of the measuring elements; verifying if the received measurement corresponds to an actual earthquake or a mechanical noise; designating a destination point; determining the expected intensity and expected arrival time; and automatically dispatching an earthquake early warning to the destination point.

12 Claims, 3 Drawing Sheets

(56) References Cited

U.S. PATENT DOCUMENTS

| | | | |
|---|---|---|---|
| 7,656,288 B2 | 2/2010 | Joslin et al. | |
| 2008/0080310 A1 | 4/2008 | Eperjesi et al. | |
| 2009/0303070 A1* | 12/2009 | Zhang | G08B 27/00 |
| | | | 340/690 |
| 2010/0169021 A1 | 7/2010 | Moisio et al. | |
| 2013/0163603 A1* | 6/2013 | Hasesaka | H04L 45/22 |
| | | | 370/401 |
| 2016/0203697 A1* | 7/2016 | Lu | G08B 21/10 |
| | | | 340/690 |
| 2018/0364375 A1* | 12/2018 | Naughton | G08B 21/18 |
| 2019/0340912 A1* | 11/2019 | Sellathamby | G08B 27/005 |
| 2021/0358286 A1* | 11/2021 | Bottner Gómez | G08B 31/00 |

FOREIGN PATENT DOCUMENTS

| | | | |
|---|---|---|---|
| JP | 2006331150 A | 12/2006 |
| JP | 2007071707 A | 3/2007 |
| JP | 2009068899 A | 4/2009 |

\* cited by examiner

EARTHQUAKE WARNING SYSTEMS AND RELATED METHODS

FIELD OF APPLICATION

The present invention belongs to the area of the communications industry; particularly, it corresponds to a system and method for early warning and reporting the probable intensity and estimated time of arrival of a seismic wave at a given location.

BACKGROUND

A yet unsolved problem is the possibility of predicting the occurrence of an earthquake, particularly the intensity range it will be involved in a specific zone, and the time it will take to reach that zone from the fracture point.

There are currently only three seismic early-warning systems worldwide, which have any real application: Mexico, Japan and Taiwan. These systems are different in their implementation; however, they are based on the same principle: seismic waves propagate, i.e., they come from a source (the hypocenter) and travel towards the periphery of the hypocenter at a relatively slow speed. If sensors are located geographically close to the point of origin of the earthquake, as soon as they detect the movement, the information is automatically communicated to a control center, which processes the data and transmits an alert to the relevant geographical areas, all at the speed of telecommunications, which is much faster than the propagation speed of seismic waves. For example, the earthquake of Feb. 27, 2010, was felt in Santiago de Chile approximately 2 minutes after the onset thereof in the Biobio Region. The earthquake of Sep. 16, 2015, was felt in Santiago approximately 1 minute after the onset thereof in Canela Baja, Coquimbo Region.

The Japanese and Taiwanese systems are essentially the same. A plurality of sensors reports their measurements constantly, whether an earthquake takes place or not. A powerful control center analyzes the data from each sensor in real time and determines if the readings represent an earthquake. As soon as the threat is identified, the probable magnitude of the earthquake is calculated and a relevant geographic radius is alerted. The alert is transmitted through the digital television system (Japan).

In Mexico, seismic activity is concentrated on the coast of the State of Guerrero, while the greatest damage caused by this activity is located in the Federal District of Mexico, more than 300 km away. Therefore, the Mexican model requires a reduced number of sensors in comparison to the ones of the Asian cases. Furthermore, the alert is propagated through a network of radio antennas to Mexico City. The warning-signal receiving devices are radio sets tuned to one of the frequencies intended for this purpose.

Compared to the previous cases, Chile has the worst conditions in the world, since seismic activity is spread over a large geographical area, close to industrial and residential centers. Accordingly, Chile requires an ad-hoc, exceptionally efficient and reliable solution.

Therefore, in the context of a seismic early-warning system, the fact of determining that the involved phenomenon is an actual earthquake and not some other mechanical phenomenon is crucial to generate a real warning that allows maintaining public reliability in the system. Transmitting a false warning is as bad as not transmitting a warning when facing an actual earthquake.

On the other hand, the longer it takes for an automatic system to dispatch an alert, the less effective it will be.

For example, in the Taiwanese system each sensor in the network transmits its motion readings (the waveform of the perceived motion) continuously and in real time, whether there is motion or not. For this same reason, the control center must continuously process the readings from all the sensors in the network to determine if an earthquake is starting in any region of the country or in the ocean. In addition, the sensors are logically grouped into so-called "sub-networks". As soon as the control center detects movement coming from the readings of any sensor of the network, a procedure is initiated, in which the readings of all the sensors of the corresponding sub-network are recorded for ten seconds so as to process the respective waveforms and determine—by extrapolation, the magnitude of the detected earthquake. Likewise, it is used to estimate the earthquake hypocenter by means of triangulation by time of arrival. With this data, a determination is made as to whether to produce an alert or not, and to which area it should be transmitted.

Other solutions related to early-warning systems have been described in the state of the art. For example, document U.S. Pat. No. 4,152,691 describes a system of seismic exploration, which eliminates the requirement for a main land cable to transmit seismic data from the sensors to a central recorder. The system includes: a data acquisition unit for collecting seismic information; and a master control and collecting unit for transmitting signals. Each data acquisition unit includes its own controller, sensor group, analog to digital converter, signal conditioner data recorder, and radio frequency receiver.

On the other hand, document US2008080310 describes a system and method for acquiring seismic data, which utilizes a plurality of field station (data acquisition), placed over a region of interest and a remote central unit. The system and method determine a condition associated with preselected attributes relating to the acquisition of the seismic data at each of the field station units. This condition allows the generation of messages at each field station, when the condition of any particular attribute meets a selected criterion and transmitting the generated messages to a wireless remote unit. The central unit recognizes the location of each sensor using a GPS system.

JP2006331150 relates to a system and method for preventing disasters, wherein the seismic intensity value measured by at least one local sensor is transmitted to a real-time operating controller. If the measured seismic intensity value transmitted from the sensor is equal or superior to a specified reference value, the controller automatically accesses a disaster prevention information center through the Internet, in order to acquire disaster information, such as epicenter, magnitude and seismic intensity at each location. Subsequently, the acquired disaster information is displayed on a display screen. The location of the sensors is pre-detailed in the controller.

U.S. Pat. No. 7,656,288 describes a system for data communications within a remote sensor system. The system includes a control center node. The control center is adapted to receive data, process the data based on a rule (threshold), and notify a user when the rule is satisfied. The central control comprises a GPS database, where the location of each sensor is determined.

Another solution is posed by US20100169021, which describes an apparatus, system, and method for a communication network that includes a wireless terminal and a central unit. The wireless terminal is configured to receive potential seismic data from a plurality of sensors, analyze said potential seismic data, determine whether an occurrence of an actual seismic event is sufficiently probable, and generate a potential seismic event message configured to indicate a potential occurrence of a seismic event. The central unit is configured to receive the potential seismic event message from the wireless terminal, analyze the potential seismic event message, determine whether a seismic event has occurred, and generate a seismic event message. The central unit has recorded the locations of the sensors by GPS.

CN105843146 discloses seismic station equipment management system. The seismic station equipment management system comprises an equipment data redundancy backup unit, which provides two kinds of backup modes: one is a working mode for automatically reading data of an internal storage device of the seismic station equipment at fixed time, and the other one is a working mode for reading and storing data collected currently by the seismic station equipment in real time. The system further comprises a remote data searching and downloading unit, which is used for supporting a station center to search and download the observation data of a seismic station; and a control unit, which is used for controlling the equipment data redundancy backup unit and the remote data searching and downloading unit according to a control instruction of the station center, and is used for carrying out diagnosis on the observation data of the seismic station equipment, and carrying out alarming or restarting when abnormity appears.

The system provides guarantee for keeping of the collected data of the seismic station.

CN106530655 discloses a network transmission method used for seismic prospecting data wireless acquisition. The method is based on regional clustering, each cluster network is composed of seismic acquisition nodes, and a node network adopts a mesh network architecture based on the IEEE 802.15.4 standard; the node network connecting with the cluster network in each cluster adopts an Ad-hoc network architecture based on the ARM-Linux and IEEE 802.11b/g standard. The innovation of regional clustering of a heterogeneous wireless network lies in the following aspects: the use of IEEE 802.15.4 network structures in the clusters ensures the low speed transmission among the nodes in the clusters and the low power consumption, IEEE 802.11b/g networks are adopted among the clusters, data among cluster heads of the clusters is transmitted at high speed and seismic data is gathered to a center control system. A wireless transmission system gets rid of the limitation of a conventional wired cable, the deployment of the collecting nodes is more convenient, the nodes are easy to expand and replace, and a large number of cable equipment, maintenance costs and manpower resources are saved.

The problem with the existing systems—such as the ones described above, is that they do not provide in their warning signal the expected time for the earthquake to be perceived at the point where the alert is received, nor the intensity said earthquake will experience. The fact of not being able to estimate the expected time and intensity to be experienced in a given area may generate certain problems in the warning systems. In particular, the risk of an earthquake may be overestimated, and issuing a warning could be risky for the population or for a particular industry. Accordingly, the required solution shall be adapted to complex seismicity conditions such as those of Chile, while being exceptionally efficient and reliable.

BRIEF SUMMARY

The present invention is related to a system and method of warning of the estimated time of arrival and expected intensity in a given area, as a result of a seismic movement. The system of the present invention is basically composed of a combination of a large number of intelligent sensors and a sophisticated seismic confirmation strategy, which allows generating alerts with very high levels of certainty in just milliseconds. The sensors intended for this function can measure both the velocity and the acceleration of the oscillatory motion (in three axes). Each sensor processes the measurement and turns it into a seismic intensity value according to the tables published by the USGS. These tables establish relationships between peak ground acceleration, peak ground velocity, and modified Mercalli intensity in California. Only when this value reaches the configured threshold, the sensor makes the decision to report the event to a control center. The arrival of each new event allows a control center to compare the time at which each sensor reported, and the order in which they did so. This may or may not conform to a seismic propagation pattern. As soon as the threat is confirmed, the first alert is issued, which can be complemented with successive updates of the intensity that will be experienced locally, based on the intensity being measured by sensors near the source. For this reason, the system requires a large number of sensors to operate properly, but the costs of commercial seismic sensors are very restrictive for a project of this nature.

The use of the system of the present invention is mainly oriented to all those industries and institutions that can mitigate the effects of an earthquake by receiving an automatic preventive alert seconds or even minutes in advance. The type of actions that the involved institution can take upon receiving this alert are divided into two types: the ones aimed at protecting the physical integrity of people, and those directed to protect assets, specifically in those production processes, wherein a stopped machine or at a slower speed is less affected by the earthquake. Some industry examples are: metallurgical industry, chemical industry, glass and plastic industry, bottling companies, power generation industry, warehouses, schools, universities, hospitals, subway trains, etc.

DETAILED DESCRIPTION

Figure 1:
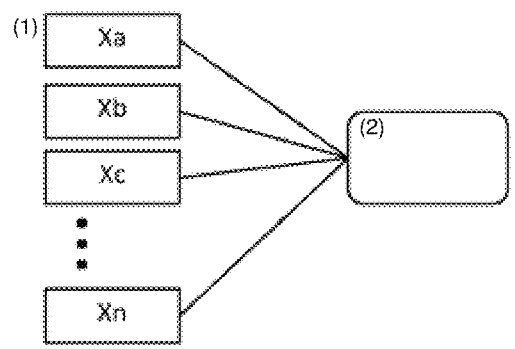
FIG. 1 shows a diagram of the interaction between the monitoring stations and the control center according to one embodiment of the invention.

The system (100) of the present invention comprises a plurality of measuring elements or monitoring stations (1) configuring a network (10) of measuring elements (1), wherein each of the measuring elements (1) is communicated to at least one common point or control center (2), as symbolically depicted in FIG. 1.

The measurement elements (1) are arranged in a specific area or coverage area, which corresponds to the geographic region delimited by perimeter monitoring stations. Each measuring element (1) stores an identifier that will uniquely identify the same within the network (10) of monitoring stations (1) having the ability to detect and measure the movement it experiences. The measuring element (1) can transform the measurement of the movement to a scalar or set of scalars representing the intensity of the movement. The measurement and its unique identifier are then transmitted in real time to the control center, thus generating an individualized measurement. For the duration of the movement of each measuring element (1), individual measurements will continue to be transmitted periodically to the control center (2). If a measuring element (1) is no longer moving, it will no longer transmit any measurements to the control center (2).

In a preferred embodiment of the invention, the control center (2) corresponds to an automatic logical entity, which has data storage and processing capacity, and comprises at least one or more data servers that may be physically located in the same place or geographically distributed in different locations. The control center (2) receives and records the individualized measurements coming from each of the monitoring stations (1) of the system (100). By recording each measurement, the control center (2) also records the time at which it is received, including—to the extent possible, the date, hour, minute, second, millisecond, and microsecond of receipt. This record of time is called a time stamp. The time stamp shall be unique for each individualized measurement received from each monitoring station (1) of the system (100).

Figure 2:
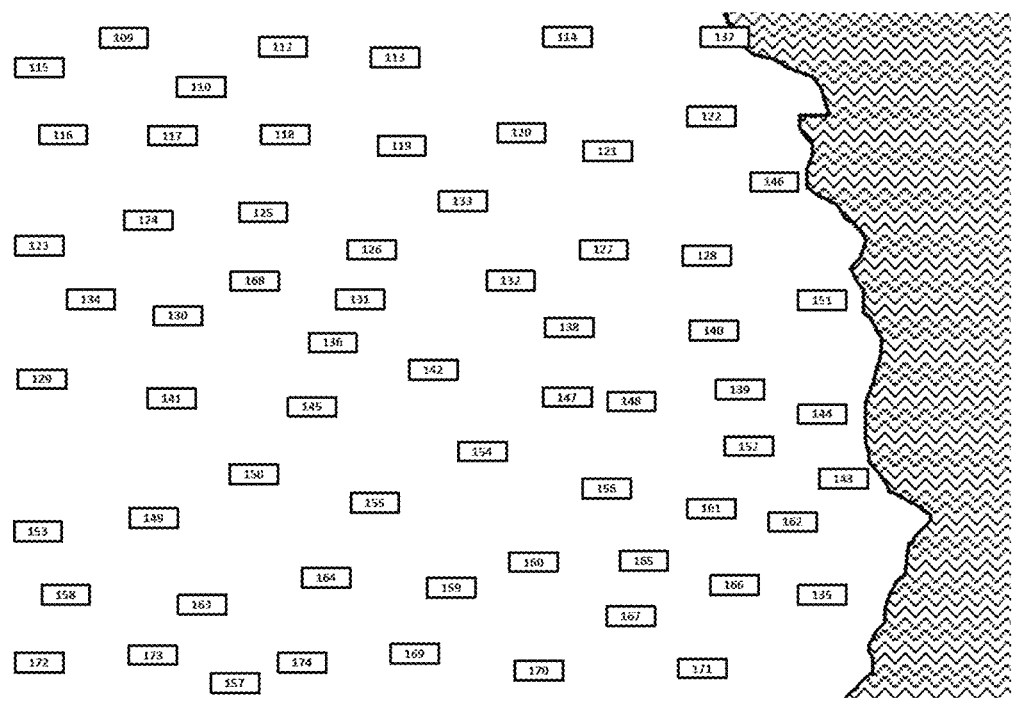
FIG. 2 shows a diagram of the network of monitoring stations distributed in a geographical area, according to one embodiment of the invention.

The system (100) of the present invention requires the presence of a large number of monitoring stations (1), geographically distributed in the region to be monitored (see FIG. 2). The higher the density of monitoring stations (1) in the system (100), the greater the effectiveness of functionality thereof.

Figure 3:
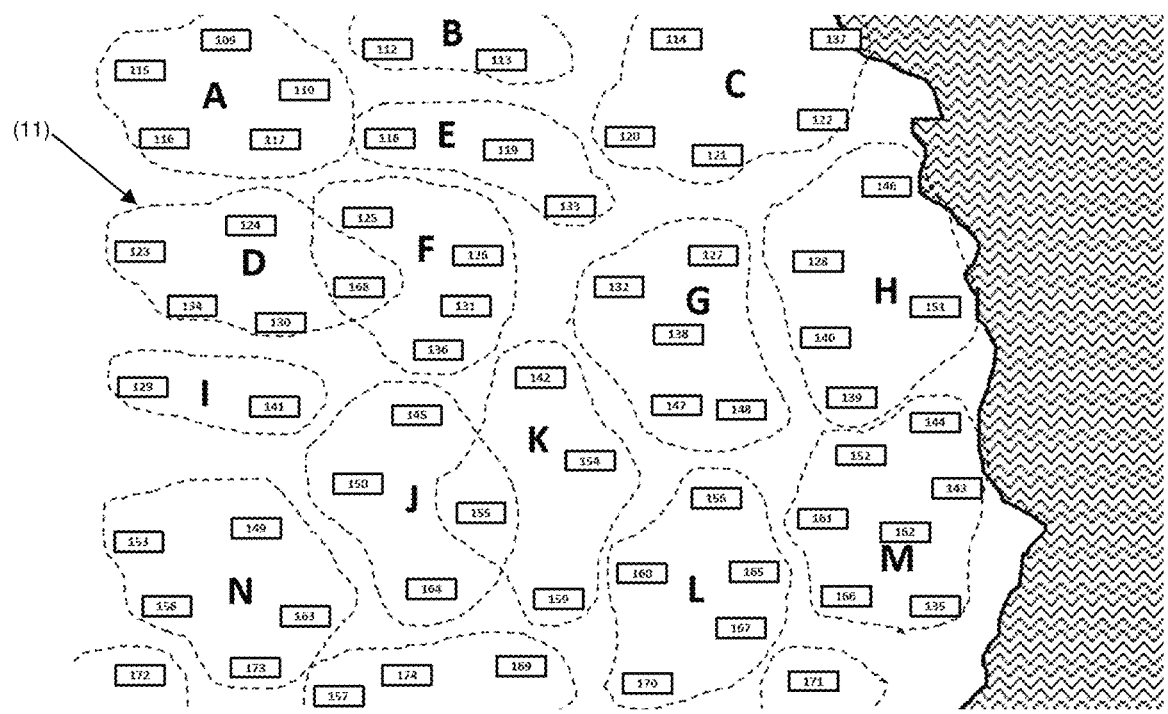
FIG. 3 shows a diagram of the distribution of swarms of stations distributed in a geographical area, according to one embodiment of the invention.
Figure 4:
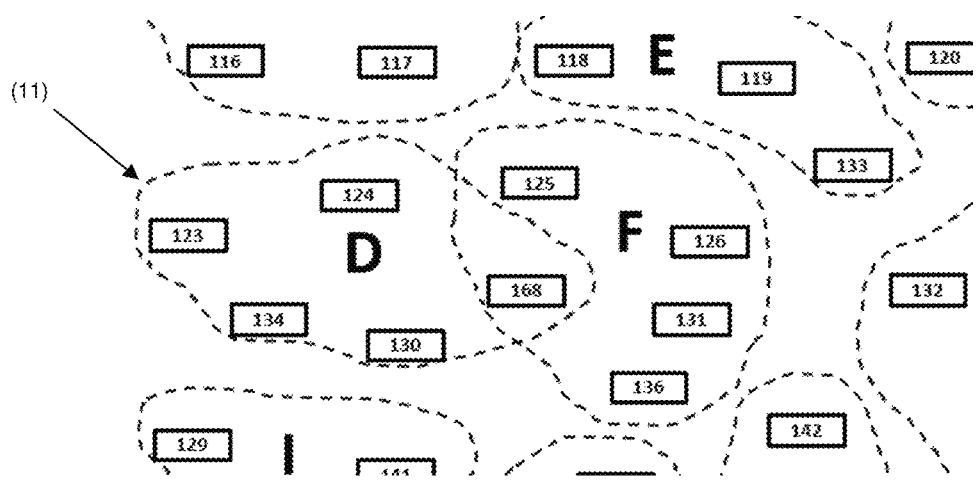
FIG. 4 shows a diagram of the distribution of swarms of intersecting stations distributed in a geographical area, according to one embodiment of the invention.

For the operation of the system (100) monitoring stations (1) are required to be logically associated in sets of geographically close stations or swarms of stations (11) (See FIG. 3). A swarm of stations (11) comprises N monitoring stations (1), wherein N>1. Each swarm of stations (11) comprises a unique identifier, which is represented within the control center (2), where the swarm identifier and the identifiers of the monitoring stations grouped therein are recorded. As this is a logical association, it is possible that the same monitoring station (1) may belong to more than one swarm (11) as shown in FIG. 4, where it can be seen that station 168 is part of swarm D and swarm F, for example.

Furthermore, the control center (2) has the capability to record the time stamp for all individualized measurements coming from the monitoring stations (1) of the system (100). In order to detect as early as possible an earthquake, differentiating it from another source of mechanical noise, the system (100) performs the following operations:

T is defined as a predetermined and particular time window for each swarm of stations (11). The time window T will have certain restrictions that will be detailed hereinafter.

In order to conclude that a real telluric phenomenon is taking place, it will suffice that M stations of a given swarm (11) (being 1<M<=N) report similar measurements to the control center (2) within the time window T. M will be a function of the number of monitoring stations (1) of the respective swarm (11).

Being $x_i$ the swarm monitoring stations, where 0<i<=N.

Being $x_a$ and $x_b$ any two stations in the swarm so as to the maximum distance at which they can be located from each other is such that the time elapsed since $x_a$ detects a real telluric movement and $x_b$ detects the same movement is less than T.

Figure 5:
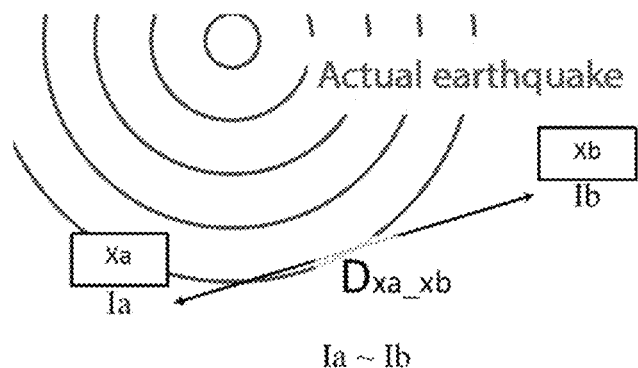
FIG. 5 shows a diagram of the detection of an actual earthquake, according to one embodiment of the invention.
Figure 6:
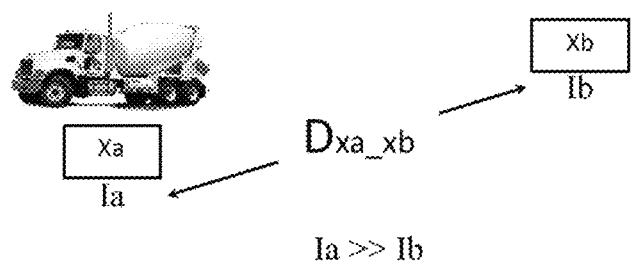
FIG. 6 shows a diagram of the detection of a fake earthquake, according to one embodiment of the invention.

Likewise, the minimum distance at which $x_a$ and $x_b$ may be located is such that the same mechanical noise of a non-telluric nature will be measured by $x_a$ at a value much higher ($I_a$) or much lower than the measurement of the same movement made by $x_b$ ($I_b$). In particular, if $x_a$ perceives a noise of non-telluric origin, $x_b$ will not perceive it and vice versa, as shown in FIGS. 5 and 6.

In order for the system (100) to determine the expected intensity and expected time of arrival, the destination point is designated as the geographic location where an earthquake early-warning message is to be delivered. In addition, the destination point shall be within the coverage area of the monitoring station network (10).

Arrival time is further defined as the measured time it takes for seismic waves to propagate from the point on the surface where they were detected by the network of monitoring stations (10) and the destination point during a historical seismic event. Expected arrival time is defined as the time it should take for seismic waves to propagate from the point on the surface where they were detected by the network of monitoring stations (10) and the destination point during a new seismic event that is in progress.

Expected intensity will be defined as the intensity that the destination point is expected to experience during an earthquake.

In the system (100) of the present invention, each time an earthquake occurs in the region of location of the network of monitoring stations (10), the individualized measurements are recorded in the control center (1) along with their respective time stamp.

It is known that the displacement velocity of telluric waves depends on the geology between the point of origin of the earthquake (hypocenter) and the point of destination (on the surface). Similarly, the change in seismic intensity between the point of origin of the earthquake measured on the surface, and the point of destination will vary depending on the geology of the land through which the telluric waves have to pass, and depending on the energy released by the seismic event.

In the system (100) of the present invention it is possible to record the historical behavior of seismic wave propagation through the network of monitoring stations (10).

Considering that the network of monitoring stations (10) involves a suffice density, it is possible to construct the following tables that will be used to determine both the estimated time of arrival and the expected intensity.

Tables of Historical Intensities by Origin

Each time an earthquake is recorded, it is followed by a series of tremors known as aftershocks, which usually take place in a volumetric zone close to the hypocenter. This feature of large earthquakes—as well as the fact that in most cases earthquakes at a given geographic point will occur at approximately the same depth, will be exploited in favor of the warning method of the present invention.

In either case, each time an earthquake occurs, the monitoring station (1) that first detected the event will be known, which will be referred to as the initial station.

In particular, the swarm to which the initial station belongs will also be known, and will be referred to as the initial swarm. This will allow the creation of a table called as table of historical intensities by origin, which will allow the initial swarm to be related to the rest of the monitoring stations in the network, showing how the intensity and arrival time behaved. For example, tables 1 and 2 are shown. These two tables correspond to a series of tables representing all swarms (11) of stations (1) that were once initial swarms for some historical earthquake. Tables 1 and 2 are intended to represent that there will not be a historical record of all possible maximum intensities; however, in order to supplement the historical information, the effects of the missing maximum intensities for each origin could be interpolated or extrapolated, as the case may be, by means of some relevant function. Thus, the tables would consist of historical information supplemented with inferred data. The proposed system (100) and method can be improved with each new seismic event that occurs, having more historical information that allows adjusting those data that have been initially inferred.

Tables of Historical Intensities by Origin

| Swarm B | | | | | | |
|---|---|---|---|---|---|---|
| Historical intensity (MM) | | | | | | |
| Monitoring station | Arrival time (s) | 8 | 6 | 5 | 4 | 3 |
| Station 1 | 22 | 6 | 3 | 2 | 1 | 0 |
| Station 2 | 16 | 7 | 5 | 4 | 0 | 0 |
| Station 3 | 11 | 7 | 5 | 5 | 2 | 0 |
| Station 4 | 0 | 8 | 6 | 5 | 4 | 3 |
| Station 5 | 0 | 8 | 6 | 4 | 4 | 3 |
| Station 6 | 15 | 7 | 5 | 3 | 3 | 2 |
| Station 7 | 21 | 7 | 4 | 2 | 2 | 0 |
| Station 8 | 22 | 6 | 3 | 0 | 0 | 0 |
| Station 9 | 21 | 6 | 3 | 0 | 0 | 0 |
| Station 10 | 31 | 5 | 0 | 0 | 0 | 0 |
| Station 11 | 32 | 4 | 0 | 0 | 0 | 0 |
| Station 12 | 47 | 3 | 0 | 0 | 0 | 0 |

| Swarm J | | | | |
|---|---|---|---|---|
| Historical intensity (MM) | | | | |
| Monitoring station | Arrival time (s) | 9 | 7 | 5 |
| Station 1 | 59 | 5 | 0 | 0 |
| Station 2 | 40 | 5 | 0 | 0 |
| Station 3 | 32 | 6 | 2 | 0 |
| Station 4 | 31 | 6 | 4 | 0 |
| Station 5 | 25 | 6 | 5 | 2 |
| Station 6 | 20 | 7 | 5 | 3 |
| Station 7 | 14 | 8 | 6 | 4 |
| Station 8 | 12 | 9 | 7 | 4 |
| Station 9 | 0 | 9 | 7 | 5 |
| Station 10 | 0 | 9 | 7 | 5 |
| Station 11 | 10 | 9 | 6 | 4 |
| Station 12 | 12 | 8 | 5 | 3 |

The reason why only one column appears with the arrival time for each table is due to the propagation velocity of the seismic waves; therefore, the respective arrival time does not depend on the earthquake intensity.

Hence, every time a new earthquake occurs, the control center (2) will have to review its historical tables of intensities by origin. In the event that a table coincides with the initial swarm of the new earthquake in progress, the geo-referenced location of the destination point to which the alert is to be sent shall be considered, searching in said table the monitoring station (1) closest to the location of the destination point of interest. This cross-checking of data allows the control center (2) to automatically dispatch an earthquake early warning to the destination point, where the warning signal will have as parameters the expected time of arrival and the expected intensity.

The invention claimed is:

1. A method of warning of estimated time of arrival and expected intensity in a given area resulting from a seismic movement, the method using a system comprising a plurality of measurement elements or monitoring stations configuring a network of measurement elements, the method comprising:
   arranging the plurality of measurement elements in a specific area or coverage area, which corresponds to a geographic region delimited by perimeter monitoring stations;
   communicating each of the plurality of measuring elements with at least one common point or control center;
   storing in each measuring element of the plurality of measuring elements a unique identifier that uniquely identifies it within the network of measuring elements, each measuring element having an ability to detect and measure movement it experiences;
   transforming, using the measuring element, a measurement of the movement to a scalar or set of scalars representing an intensity of the movement;
   transmitting in real time for the duration of the movement experienced by each measurement element until the measurement element does not experience any movement the measurement and the unique identifier of the measurement element to the control center, the measurement and unique identifier forming an individualized measurement;
   recording through the control center individualized measurements from each of the plurality of measuring elements;
   determining at the control center if the received measurement corresponds to an actual earthquake or a mechanical noise;
   designating a destination point in the geographic region for delivery of an earthquake early warning message within the coverage area of the network of measurement elements;
   determining an expected intensity and expected arrival time at the destination point by comparing a historical measurement recorded at the control center from a measurement element with a historical intensity and historical arrival time with the individualized measurement from at least one of the plurality of measuring elements associated with an initial measuring element, the individualized measurement being from part of an initial swarm;
   if the historical measurement corresponds with the individualized measurement of the initial swarm, detecting a new earthquake in progress and considering a georeferenced location of the destination point, searching the records for the measurement element of the network of measurement elements geographically closest to the destination point; and
   automatically dispatching an earthquake early warning to the destination point, where the warning signal has as parameters an expected time of arrival and an expected intensity of the new earthquake.

2. The method according to claim 1, where the control center is an automatic logical entity comprising data storage and processing capacity, and wherein the system further comprises at least one or more data servers physically located in a single location or geographically distributed in different locations.

3. The method according to claim 1, wherein recording each individualized measurement using the control center further comprises where the control center also records a time the individualized measurement is received including a date, hour, minute, second, millisecond and microsecond of reception of the individualized measurement by the control center as a time stamp of the individualized measurement.

4. The method according to claim 1, where the network of measuring elements are logically associated in sets of geographically close or swarms of measuring elements.

5. The method according to claim 4, where a swarm of measuring elements comprises N measuring elements, where N>1.

6. The method according to claim 5, where each swarm of measuring elements comprises a unique swarm identifier, provided to the control center, where the unique swarm identifier and the unique identifiers of each of the measuring elements grouped therein are recorded.

7. The method according to claim 6, where the same measuring element of the network of measuring elements may belong to more than one swarm of measuring elements.

8. The method according to claim 7, wherein in order to verify if the measurement corresponds to the actual earthquake, T is defined as a predetermined and particular time window for each swarm of measuring elements.

9. The method according to claim 8, wherein a telluric phenomenon is real if M measuring elements of a given swarm of measuring elements (wherein 1<M<=N) report similar measurements to the control center within the time window T.

10. The method according to claim 9, where a maximum distance at which two measuring elements belonging to the same swarm $x_a$ and $x_b$ is located from each other is determined so that a time elapsed since $x_a$ detects a real telluric movement and $x_b$ detects the same real telluric movement is less than T.

11. The method according to claim 9, where the minimum distance at which $x_a$ and $x_b$ may be located is determined so that the same mechanical noise of a non-telluric nature will be measured by $x_a$ at a value much higher ($I_a$) or much lower than a measurement of the same movement made by $x_b$ ($I_b$).

12. The method according to claim 1, where recording the measurement through the control center further comprises where the measurement is recorded in tables for use in determining an expected intensity and an estimated time of arrival.

* * * * *